(12) United States Patent
Paquette et al.

(10) Patent No.: US 7,583,840 B2
(45) Date of Patent: *Sep. 1, 2009

(54) METHODS AND SYSTEMS FOR DETECTION OF REPEATING PATTERNS OF FEATURES

(75) Inventors: Daniel R. Paquette, Endicott, NY (US); Richard C. Vanhall, Owego, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 12/144,775

(22) Filed: Jun. 24, 2008

(65) Prior Publication Data

US 2008/0260259 A1    Oct. 23, 2008

Related U.S. Application Data

(63) Continuation of application No. 10/623,847, filed on Jul. 21, 2003.

(51) Int. Cl.
*G06K 9/34* (2006.01)
*G06K 9/00* (2006.01)

(52) U.S. Cl. .............. 382/170; 382/101; 382/175; 382/181

(58) Field of Classification Search ............ 382/101, 382/170–172, 175, 181–184, 190–203
See application file for complete search history.

(56) References Cited

U.S. PATENT DOCUMENTS

| | | | | |
|---|---|---|---|---|
| 3,829,841 A * | 8/1974 | Steinberg | .................... | 345/440 |
| 4,158,835 A * | 6/1979 | Miura et al. | ................. | 382/101 |
| 4,183,013 A * | 1/1980 | Agrawala et al. | ........... | 382/173 |
| 4,736,441 A * | 4/1988 | Hirose et al. | ................ | 382/101 |
| 4,783,825 A * | 11/1988 | Hirose et al. | ................ | 382/101 |
| 4,891,750 A * | 1/1990 | Pastor et al. | ................ | 382/197 |
| 4,933,865 A * | 6/1990 | Yamamoto et al. | .......... | 382/203 |
| 4,970,653 A * | 11/1990 | Kenue | ........................ | 701/301 |
| 5,127,063 A * | 6/1992 | Nishiya et al. | .............. | 382/141 |
| 5,182,777 A * | 1/1993 | Nakayama et al. | .......... | 382/170 |
| 5,329,105 A * | 7/1994 | Klancnik et al. | ....... | 235/462.16 |
| 5,583,949 A * | 12/1996 | Smith et al. | ................. | 382/199 |
| 5,629,989 A * | 5/1997 | Osada | ........................ | 382/281 |
| 5,774,584 A * | 6/1998 | Matsumoto et al. | ......... | 382/194 |
| 5,912,698 A * | 6/1999 | Graulich et al. | ............... | 348/91 |
| 5,930,391 A * | 7/1999 | Kinjo | ......................... | 382/173 |

(Continued)

FOREIGN PATENT DOCUMENTS

JP      61-275986      12/1986

OTHER PUBLICATIONS

Kahn, P., Kitchen, L., and Riseman, E.M. (1990) "A Fast Line Finder for Vision-Guided Robot Navigation." IEEE Trans. on Pat. Anal. & Mach. Intel. 12(11), 1098-1102.

(Continued)

*Primary Examiner*—Daniel G Mariam
*Assistant Examiner*—Manav Seth
(74) *Attorney, Agent, or Firm*—Burns & Levinson LLP; Jacob N. Erlich; Orlando Lopez

(57) ABSTRACT

Methods and system for automatic identification of repeating patterns of slanted stripe features (marks) on an item.

5 Claims, 9 Drawing Sheets

U.S. PATENT DOCUMENTS

| | | | |
|---|---|---|---|
| 6,002,793 A * | 12/1999 | Silver et al. | 382/152 |
| 6,176,428 B1 * | 1/2001 | Joseph et al. | 235/462.1 |
| 6,289,109 B1 * | 9/2001 | Gocht et al. | 382/101 |
| 6,622,085 B1 * | 9/2003 | Amita et al. | 701/208 |
| 6,697,535 B1 * | 2/2004 | Dutta-Choudhury | 382/266 |
| 6,813,313 B2 * | 11/2004 | Xu et al. | 375/240.08 |
| 6,901,167 B2 * | 5/2005 | Herley | 382/199 |
| 6,901,171 B1 * | 5/2005 | Dutta-Choudhury et al. | 382/266 |
| 7,075,634 B2 * | 7/2006 | Uezono et al. | 356/139.1 |
| 7,164,795 B2 * | 1/2007 | Ohara et al. | 382/199 |
| 2001/0056408 A1 * | 12/2001 | Herbert | 705/60 |
| 2002/0018594 A1 * | 2/2002 | Xu et al. | 382/190 |
| 2002/0021840 A1 * | 2/2002 | Ohara et al. | 382/199 |
| 2002/0063893 A1 * | 5/2002 | Fujieda | 358/1.15 |
| 2002/0196977 A1 * | 12/2002 | Navon | 382/176 |
| 2003/0059933 A1 * | 3/2003 | Tresco et al. | 435/299.1 |
| 2004/0240753 A1 * | 12/2004 | Hu et al. | 382/286 |
| 2005/0013486 A1 * | 1/2005 | Wiedemann et al. | 382/181 |
| 2005/0018878 A1 * | 1/2005 | Paquette et al. | 382/101 |
| 2005/0069173 A1 * | 3/2005 | Morisada et al. | 382/103 |
| 2005/0185819 A1 * | 8/2005 | Delp et al. | 382/100 |
| 2005/0259847 A1 * | 11/2005 | Genc et al. | 382/103 |

OTHER PUBLICATIONS

Aste, M., Boninsegna, M. and Caprile, B. (1993). "A Fast Straight Line Extractor for Vision-Guided Robot Navigation." Technical Report, Istituto per la Ricerca Scientifica e Tecnologica. Available at http://citeseer.nj.nec.com/aste93fast.html.

* cited by examiner

METHODS AND SYSTEMS FOR DETECTION OF REPEATING PATTERNS OF FEATURES

CROSS REFERENCE TO RELATED APPLICATIONS

This application is a continuation of co-pending U.S. patent application Ser. No. 10/623,847, filed Jul. 21, 2003, entitled METHODS AND SYSTEMS FOR DETECTION OF REPEATING PATTERNS OF FEATURES, which is incorporated by reference herein in its entirety.

BACKGROUND

This invention relates generally to methods and systems for recognizing patterns, and, more particularly, to methods and systems for automatic detection of repeating patterns of features.

Repeating stripe features (also referred as "chevron marks") are used in a variety of applications. In one application, edge marks such as alternating red and blue diagonal stripes located at equal intervals around the edge of the envelope are used, in some countries, to indicate that postal material is airmail. Other marks, such as airmail marks, may overlap the striped edge airmail marks. Stamps may also partially overlap the edge marks. This overlapping of airmail marks and edge marks and of stamps and edge marks at times makes the airmail mark and the stamp difficult to distinguish from the edge marks and, therefore, difficult to detect. Separate detection of the edge marks ("chevron" marks) will reduce any difficulty caused by overlapping of other marks and the edge marks.

While the detection of repeating stripe ("chevron") marks is not a difficult task for a human observer, the automatic detection of repeating stripe ("chevron") features (marks) presents unique challenges.

It is therefore an object of this invention to provide methods and systems for automatic detection of repeating patterns of slanted stripe features.

It is a further object of this invention to provide methods and systems for automatic detection of repeating patterns of slanted stripe features (marks) on mail items.

BRIEF SUMMARY

The objects set forth above as well as further and other objects and advantages of the present invention are achieved by the embodiments of the invention described hereinbelow.

A method and system for automatic detection of repeating patterns of slanted stripe features on an item are disclosed.

In the initial step of the method of this invention a digital image of the item is acquired. Pixel data is then obtained for pixels in the digital image. Line segment data is extracted from the pixel data. A set of collinear line segments is identified from the line segment data. A set of lines intersecting members of the set of collinear line segments is identified from the line segment data. The set of intersecting lines and the set of collinear lines identify a set of features (marks). In one embodiment of the method of this invention, in identifying the set of collinear line segments, the method also includes constructing a histogram displaying a number of line segments in predetermined angular ranges. In another embodiment, the method includes verifying that the identified set of features is located at a preselected location on the item. The method can be applied to identifying and locating slanted stripe marks on mail pieces.

A system of this invention includes a digital image acquisition module, one or more processors, and one or more computer readable memories having computer readable code that enables the one or more processors to perform the method of this invention. The computer readable code that enables the one or more processors to perform the method of this invention can be embodied in a computer readable medium.

For a better understanding of the present invention, together with other and further objects thereof, reference is made to the accompanying drawings and detailed description and its scope will be pointed out in the appended claims.

DETAILED DESCRIPTION

Methods and system for automatic detection of repeating patterns of slanted stripe features (Hereinafter also referred to as marks) on an item are disclosed herein below.

Figure 1:
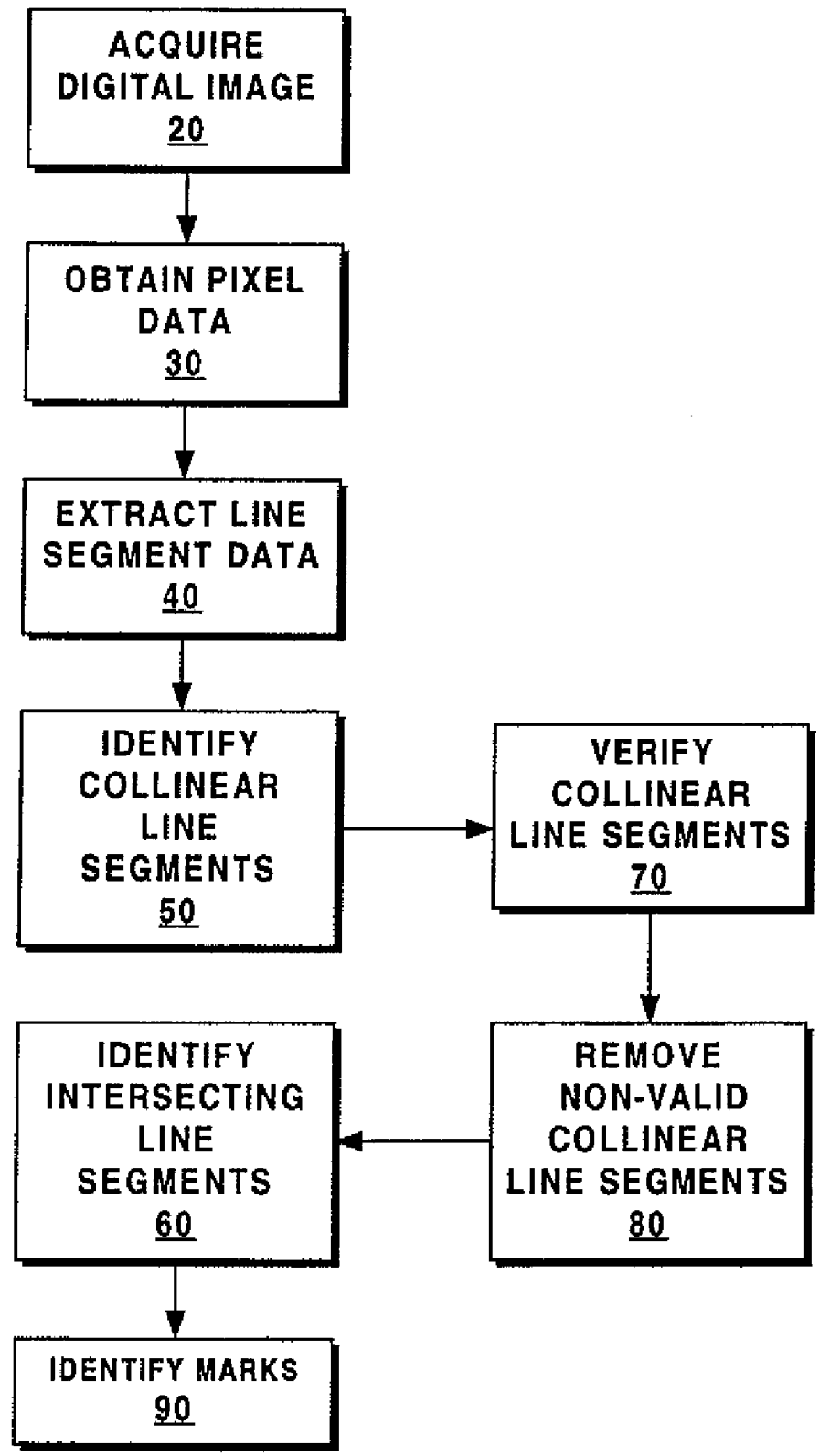
FIG. 1 is a flowchart of an embodiment of the method of this invention.

A flowchart of an embodiment of the method 10 of this invention is shown in FIG. 1. Referring to FIG. 1, the first step in the method is the acquisition of a digital image (step 20, FIG. 1). Pixel data is obtained for each pixel in the image (step 30, FIG. 1). Line segment data is then obtained from the pixel data (step 40, FIG. 1) by conventional means. A number of conventional methods have can be utilized for obtaining line segment data from the pixel data. Some examples of methods that can be utilized for obtaining line segment data from the pixel data are, but not limited to, the line finder algorithm of Khan, Kitchen and Riseman (Kahn, P., Kitchen, L., and Riseman, E. M. *A fast line finder for vision-guided robot navigation.* IEEE Transactions on Pattern Analysis and Machine Intelligence 12, 3 (1990), 1098-1102) and the line extractor of Aste, Boninsegna and Caprile (M. Aste, M. Boninsegna, and B. Caprile. *A Fast Straight Line Extractor for Vision Guided Robot Navigation*, Technical report, Istituto per la Ricerca Scientifica e Tecnologica, 1994 available at http://citeseer.n-j.nec.com/aste93fast.html).

Once the line segment data have been obtained, a group of collinear segments can be identified (step 50, FIG. 1). Comparing properties of a collinear line segment to characteristic values (properties) representative of the group of collinear segments, it can be verified whether each collinear line segment from the plurality of collinear line segments is a valid element of the group of collinear line segments (step 70, FIG. 1). Those elements that are not deemed to be members of the group are culled from the group (step 80, FIG. 1). (In one embodiment, the length of each collinear line segment is compared to the median length for the group of collinear line segments. If the length of the collinear line segment is not within a predetermined threshold of the median length, the line segment is culled.)

Utilizing the culled group of collinear line segments and the line segment data, a group of lines intersecting the culled group of collinear lines is identified (step 90, FIG. 1). The group of intersecting lines and the group of collinear lines identifies a group of marks.

Utilizing the method described above, a subsequent group of collinear line segments can be identified from the line segment data and a subsequent group of intersecting lines intersecting the subsequent group of collinear lines can be identified. The subsequent group of intersecting lines and the subsequent group of collinear lines identifies a subsequent group of marks.

Figure 3:
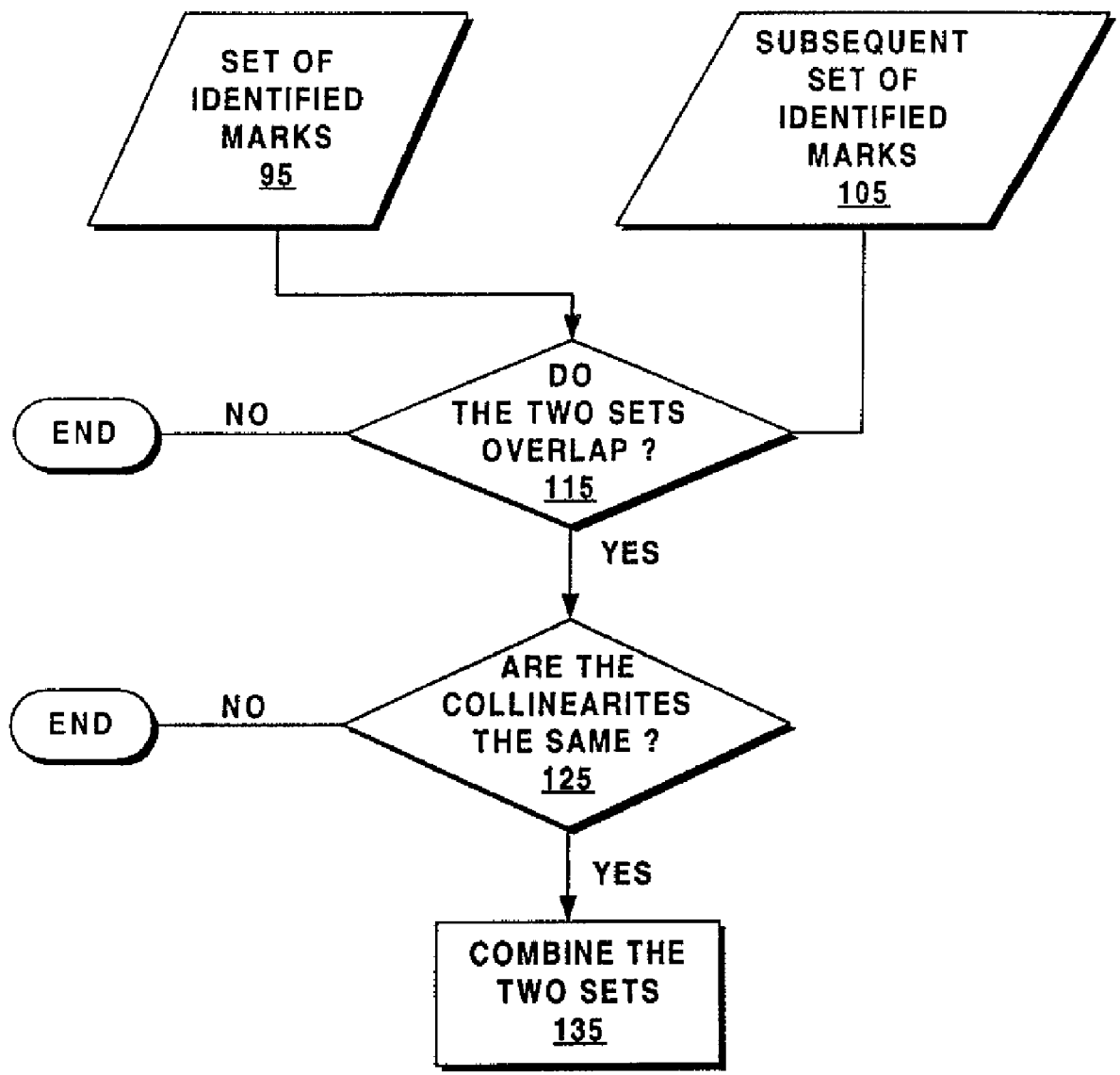
FIG. 3 is a flowchart of another embodiment of the method of this invention.

From the line segment data, it can be determined whether the group of identified marks 95 (FIG. 3) and the subsequent group of identified marks 105 (FIG. 3) are substantially overlapping (step 115, FIG. 3). From the line segment data, it can also be determined whether the group of identified marks and the subsequent group of identified marks have substantially similar collinearity (step 125, FIG. 3). If the group of identified marks and the subsequent group of identified marks are substantially overlapping and if the group of identified marks and the subsequent group of identified marks have substantially similar collinearity, the group of identified marks and the subsequent group of identified marks are merged into one group (step 135, FIG. 3).

Figure 4:
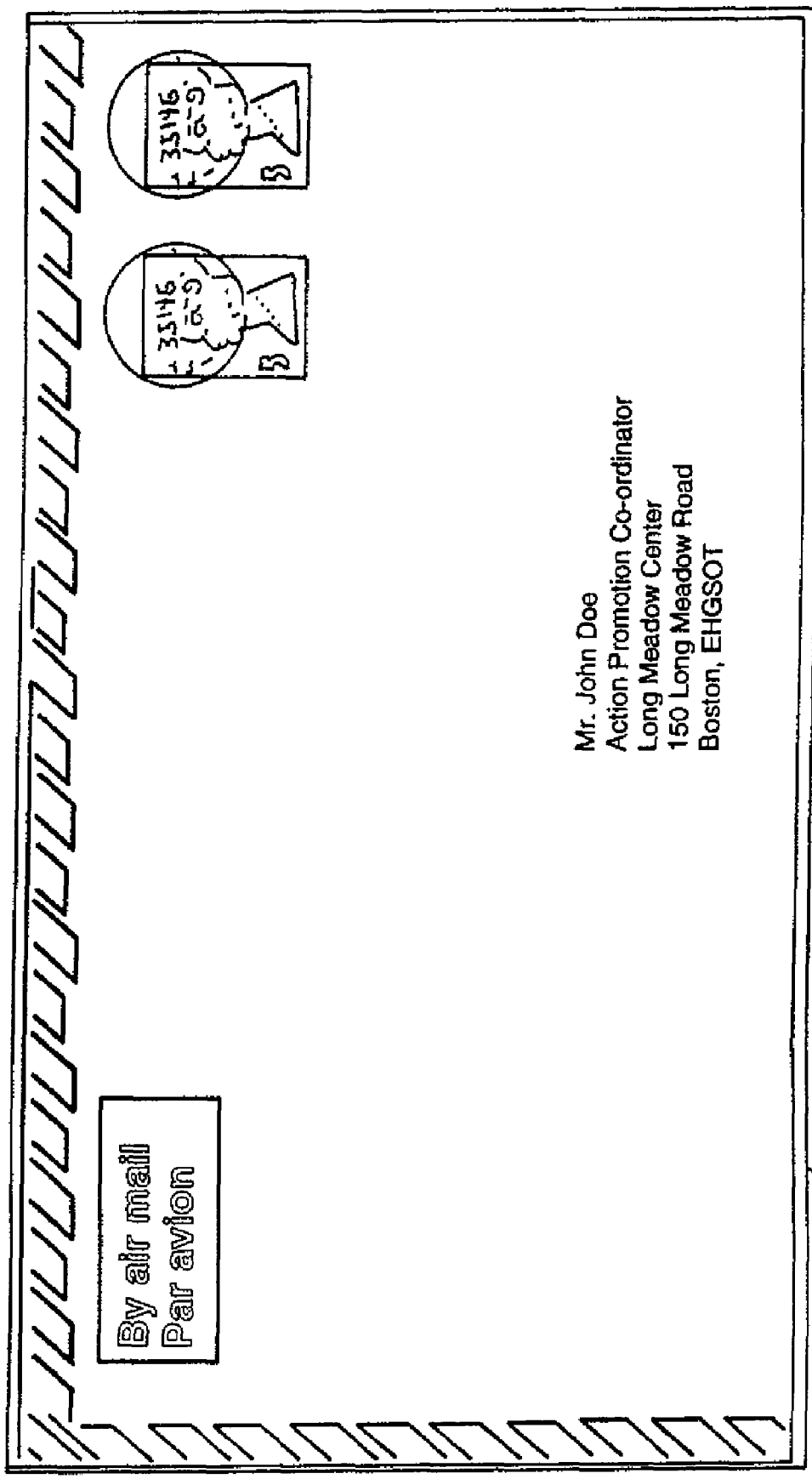
FIG. 4 is a graphical schematic representation of an original image of exemplary item including marks.

In order to better understand the method of this invention, a detailed embodiment is given below. FIG. 4 depicts a mail piece containing marks around the edges of a mail piece 200 that indicates that the mail is airmail. The marks, a repeating pattern of parallelograms or rectangles of alternating colors surrounding the outside of the envelope, are referred to as chevrons. In order to automatically determine whether the mail piece is airmail, the chevron marks have to identified.

Figure 2A:
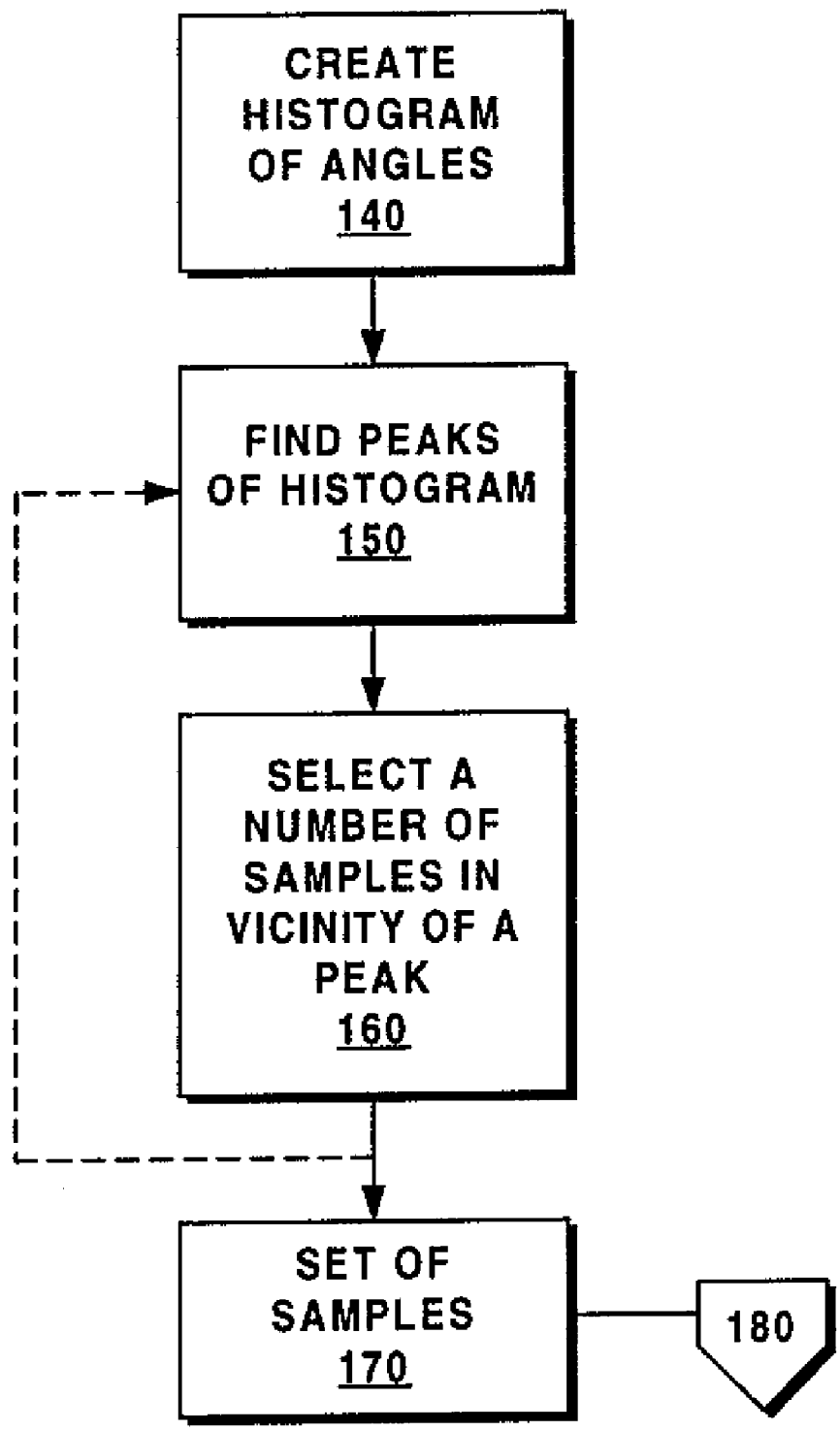
FIG. 2a is an initial section of a flowchart of a detailed embodiment of the method of this invention.

Utilizing the method of FIG. 1, a digital image is acquired (step 20, FIG. 1). Pixel data is obtained for each pixel in the image (step 30, FIG. 1). Line segment data, including line angle data, is then obtained from the pixel data (step 40, FIG. 1) by conventional means such as, but not limited to, the line finder algorithm of Khan, Kitchen and Riseman and the line extractor of Aste, Boninsegna and Caprile. A histogram of the angles of the lines is obtained (step 140, FIG. 2a). A number of peaks, p peaks, in the line angle histogram are located (step 150, FIG. 2a). For each peak in the histogram, the peak is grouped with a number of the neighboring bins, n bins, to the right and left in the histogram (step 160, FIG. 2a). The group of line data samples including the histogram peak and the neighboring n bins to the right and left in the histogram constitute the set of line data samples 170 (FIG. 2a) to be utilized in identifying the marks.

Figure 2B:
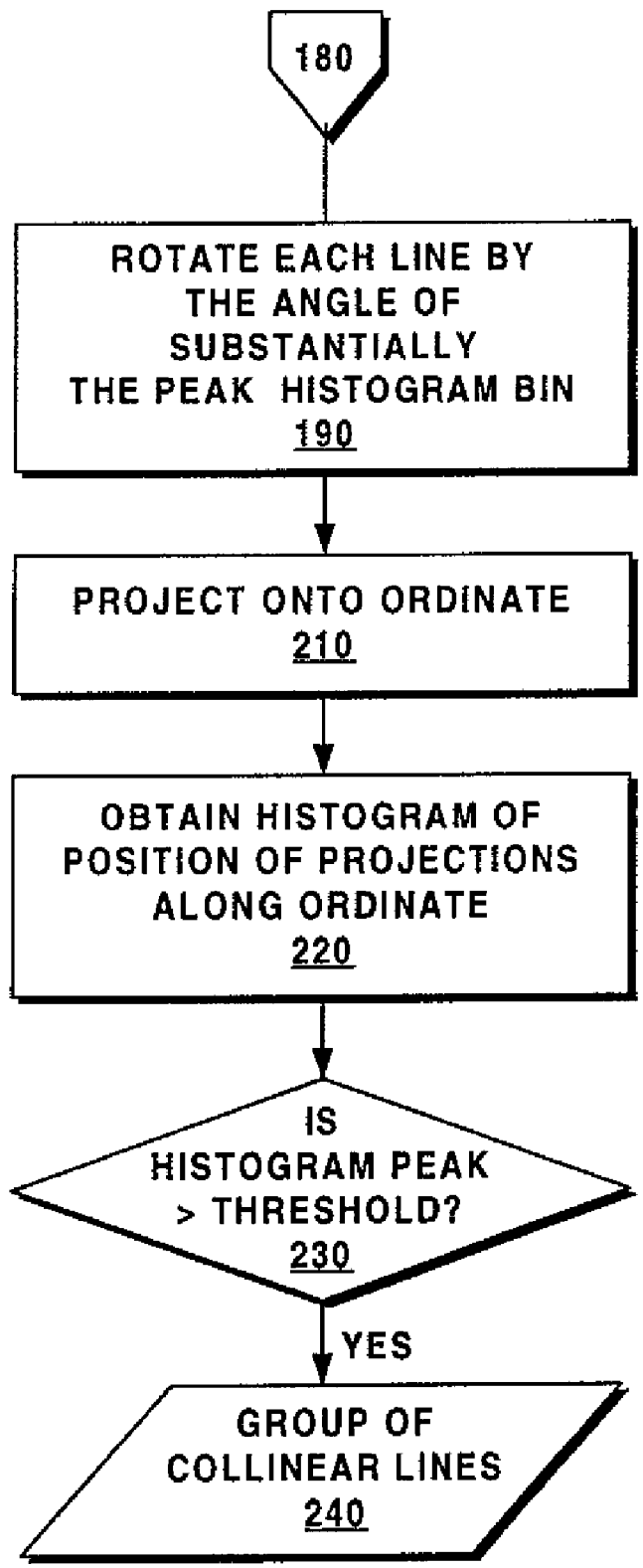
FIG. 2b is a subsequent section of a flowchart of a detailed embodiment of the method of this invention.

The identifying of the collinear line segments (step 50, FIG. 1) in the set of line data samples 170 includes the following steps. The lines in the set of line data samples 170 are rotationally corrected by rotating the lines by the angle of the peak bin in the histogram (step 190, FIG. 2b). The rotated lines are projected onto the coordinate representing the edge of the mail item, labeled as the ordinate (step 210, FIG. 2b). A histogram of the number of lines projected onto an ordinate axis location is created. The peak value of the histogram of the number of lines projected onto an ordinate axis location is compared to a predetermined threshold. If the peak value is bigger than the threshold, the lines in the histogram bin containing the peak value are identified as a group of collinear lines.

Figure 5:
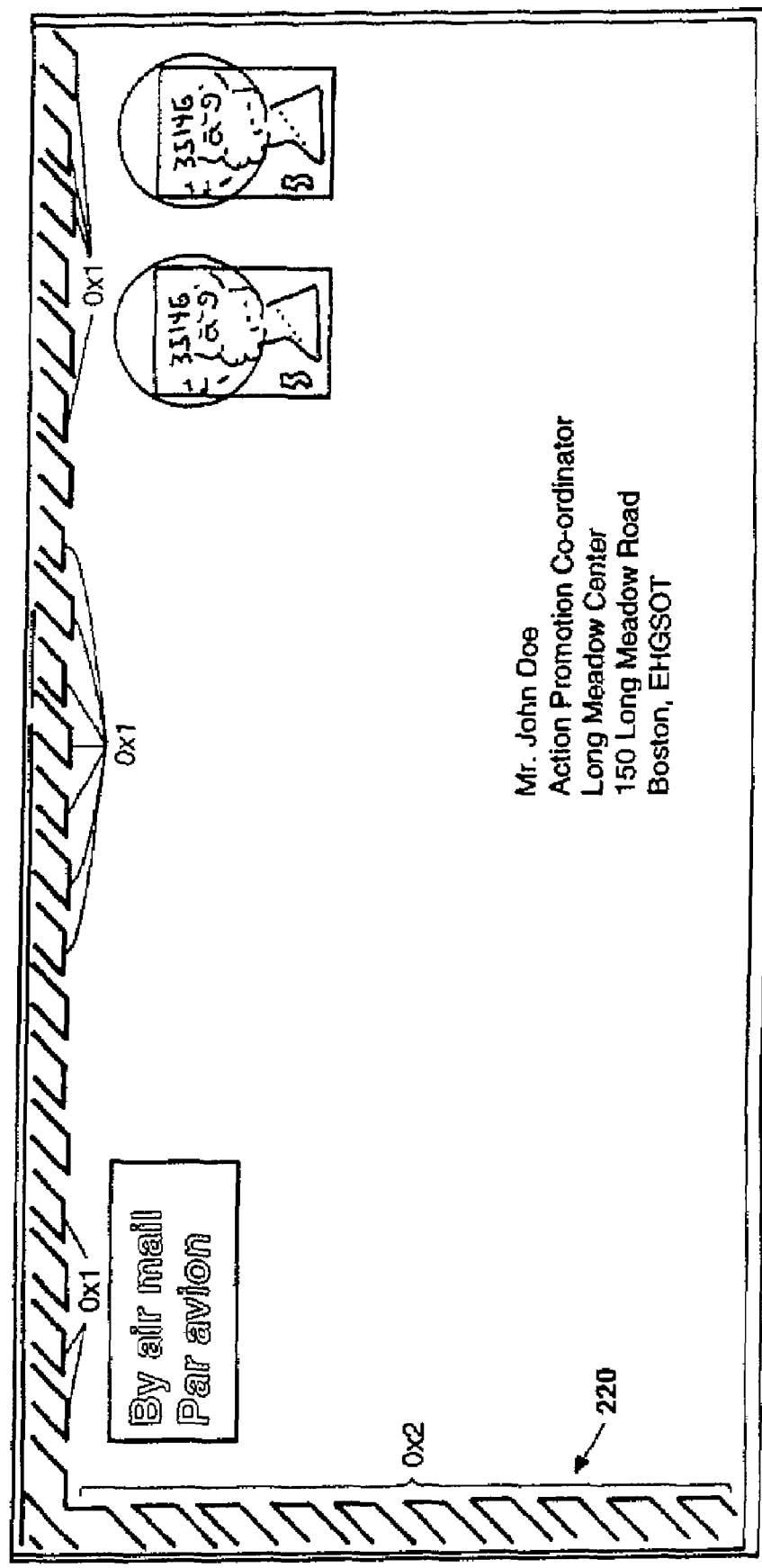
FIG. 5 is a graphical schematic representation of the image of FIG. 4 including partial results of an embodiment of the method of this invention.

The process is repeated for the set of line data samples 170 corresponding to each peak in the histogram resulting in a number of groups of collinear lines. For each of these groups, the median line length in the group is found and all lines that are not within a predetermined median line threshold are removed from the group. Any groups that no longer have enough lines to be considered are removed. A group of collinear lines 220 in the mail piece 200 of FIG. 4 is shown in FIG. 5.

Figure 6:
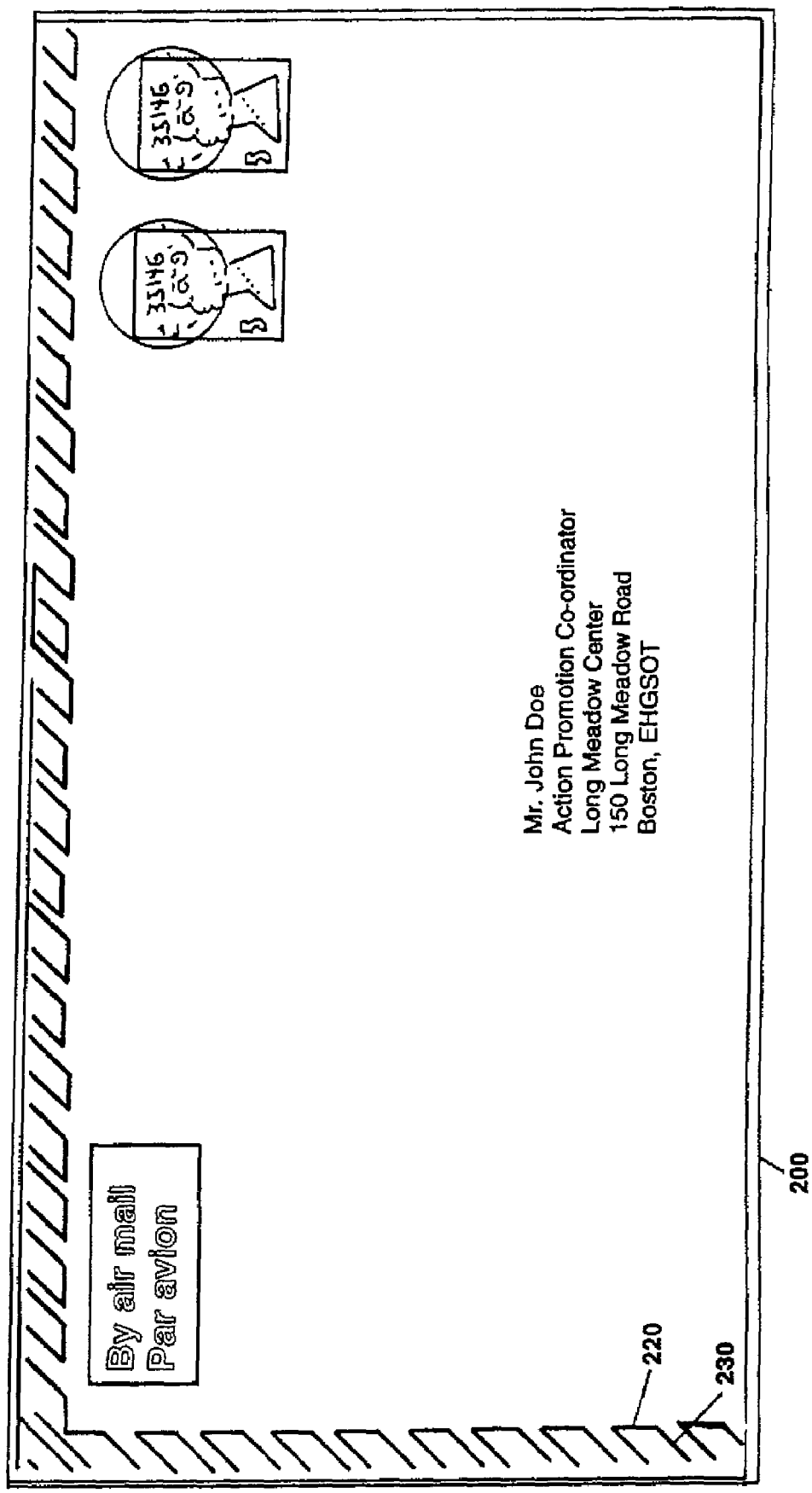
FIG. 6 is a graphical schematic representation of the image of FIG. 4 including further partial results of an embodiment of the method of this invention.

For each group of collinear lines, a group of intersecting lines is identified from the corresponding set of line data samples 170. The group of collinear lines and the corresponding group of intersecting lines constitute a group of identified marks. The collinear line group 220 of FIG. 5 and the corresponding group of intersecting lines 230 are shown in FIG. 6.

For any two groups of identified marks, it can be determined whether one group of identified marks and the other group of identified marks overlap within an overlapping threshold. It can be also determined whether the two groups, one group of identified marks and the other group of identified marks, have a similar collinear angle within a collinearity threshold. If one group of identified marks and the other group of identified marks overlap within an overlapping threshold and one group of identified marks and the other group of identified marks have a similar collinear angle within a collinearity threshold, the groups are merged. The determination of whether one group of identified marks and the other group of identified marks overlap can, in one embodiment, be performed by obtaining, for each group of identified marks, a bounding rectangle (box) including the group of collinear lines and the corresponding edge of the mail item 200 shown in FIG. 4 and bounding the group of intersecting lines. If two bounding rectangles overlap, the two groups of identified lines overlap.

The thresholds utilized in the various comparisons detailed above can be, but not limited to, obtained by analysis and experimentation on a large database of similar image images.

Figure 7:
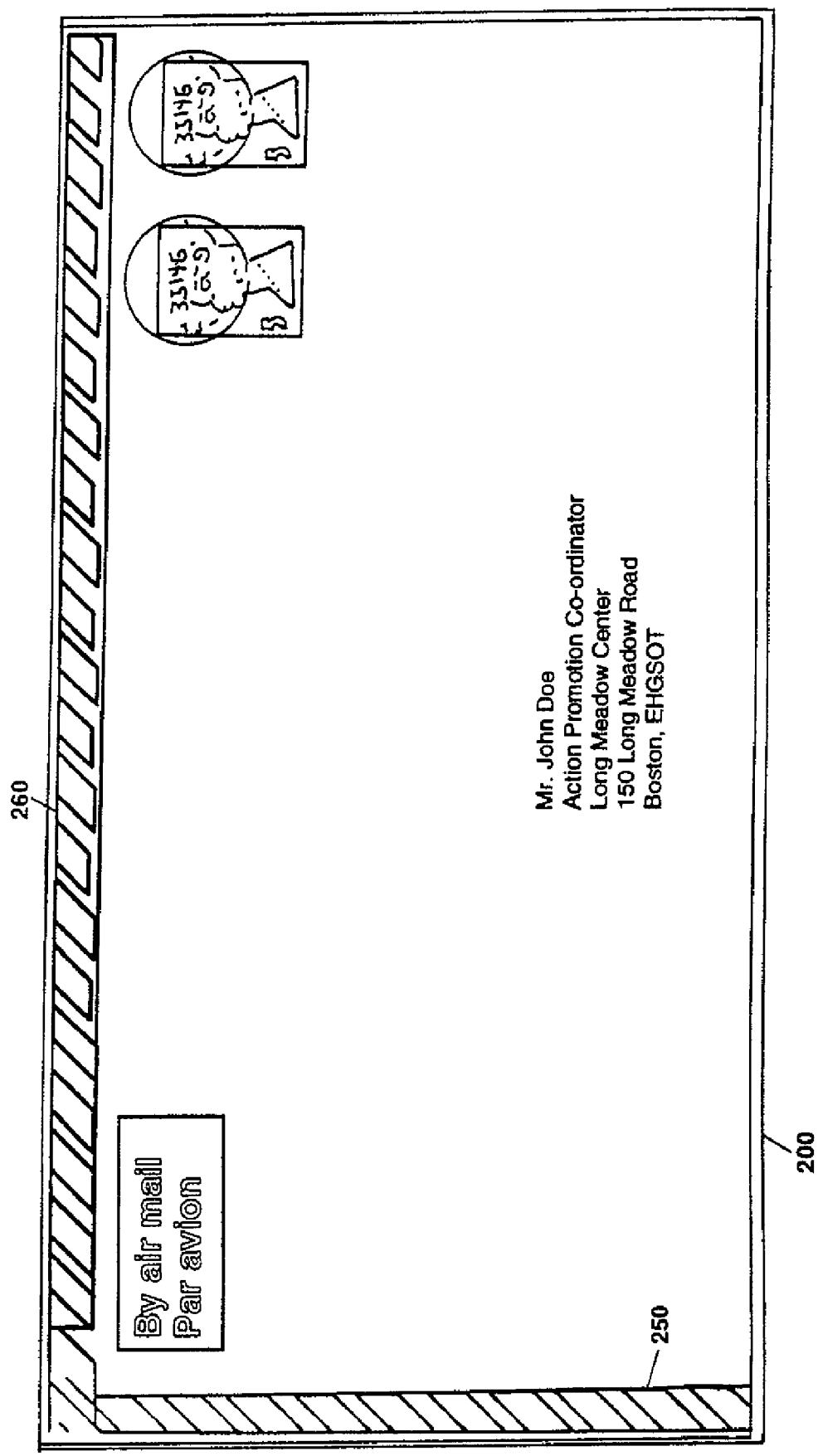
FIG. 7 is a graphical schematic representation of the image of FIG. 4 including final results of an embodiment of the method of this invention.

The resulting groups of collinear lines and the corresponding groups of intersecting lines constitute the groups of identified marks. An estimated number of marks (Chevron Elements) and the estimated width of each mark can also be obtained. FIG. 7 depicts the two resulting groups of identified marks 250, 260 for the mail item 200 of FIG. 4.

If information is available about the location and size of other blocks on the mail piece 200, that information can be used to determine if the marks 250, 260 are in a location on the mail piece 200 where chevron marks are expected to be (a "valid" or preselected location). Thus, in the embodiment of FIG. 7, from location and size of the address block, and/or the stamps, and/or the airmail indicator on the mail piece 200, it is possible to verify that the identified groups of marks 250, 260 are located at a valid location on the item.

Figure 8:
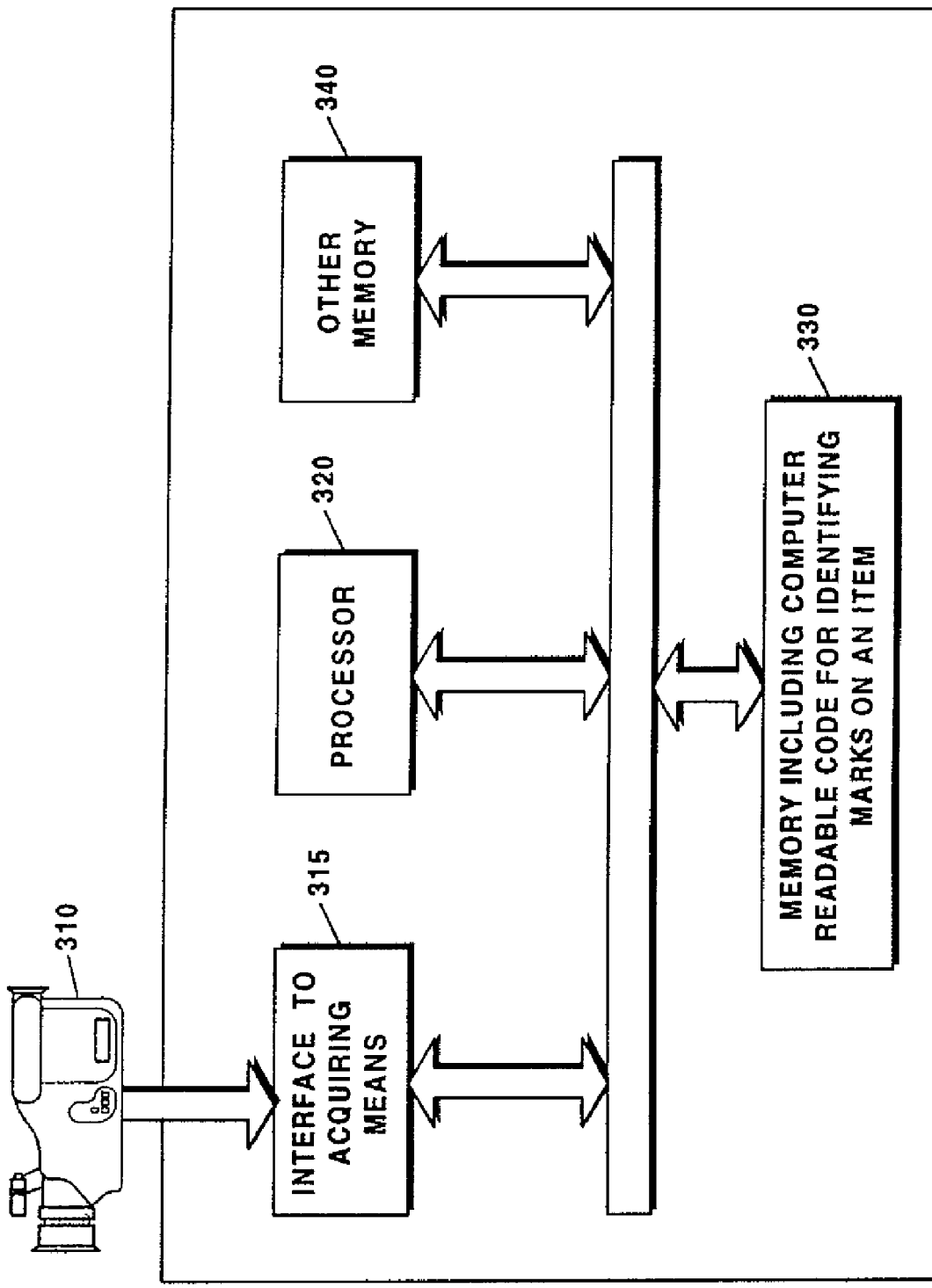
FIG. 8 is a block diagram representative of an embodiment of the system of this invention.

A block diagram representation of an embodiment of the system 300 that implements the method of this invention is shown in FIG. 8. Referring to FIG. 8, the system 300 includes a digital image acquisition module 310 capable of acquiring a digital image of the item, one or more processors 320, and one or more computer readable memories 330. The one or more computer readable memories have computer readable code embodied therein, which is capable of causing the at least one processor to execute the above described methods of this invention. The digital image acquisition module 310 can be, but is not limited to, a video camera, a digital still camera, or an image acquisition sensor with the necessary optics and control and processing electronics. The interface component 315 receives the image data from the digital image acquisition module 310 and provides the image data to the computer readable memories 330, 340. The computer readable memory 340 provides memory for other operational tasks.

It should also be noted that "mail piece" as used in this invention refers to any addressed object in a package or mail delivery system.

It should also be noted that although the methods of this invention have been described in detail for the embodiment in which the slanted marks are located on a mail piece, the methods of this invention can be applied to any repeating pattern of slanted stripe features, such as slanted marks.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. Input device, as used herein, refers to any device, such as, but not limited to, a keyboard, a mouse, voice input, a touch sensitive pad or display, a computer pen, or a writing tablet, that is used to provide input data to provide data to programmable computer. The output information may be applied to one or more output devices.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A computer program product comprising:
   a computer usable memory having computer readable code embodied therein, the computer readable code capable of causing a computer system to:
   obtain pixel data for a plurality of pixels in a digital image;
   extract line segment data from the pixel data, said line segment data comprising line segment angle data;
   identify a plurality of collinear line segments from the line segment data;
   identify another plurality of line segments from the line segment data; each line
   segment from said another plurality of line segments intersecting at least one line segment of said plurality of collinear line segments; and
   identify, utilizing said another plurality of line segments and the plurality of collinear lines, a plurality of features, the identified plurality of features comprising said another plurality of lines segments and the plurality of collinear lines.

2. The computer program product of claim 1 wherein the computer readable code is further capable of causing the computer system to:
   verify that each collinear line segment from the plurality of collinear line segments has characteristic properties of an element of the plurality of collinear line segments; and
   remove from the plurality of collinear line segments each collinear line segment that does not have characteristic properties of an element of the plurality of collinear lines segments.

3. The computer program product of claim 1 wherein the computer readable code is further capable of causing the computer system to:
   verify that the identified plurality of features is located at a preselected location on the item.

4. The computer program product of claim 1 wherein the computer readable code is further capable of causing the computer system to:
   identify a subsequent plurality of collinear line segments from the line segment data;
   identify a subsequent plurality of intersecting lines from the line segment data; and
   identify a subsequent plurality of features comprising the subsequent plurality of intersecting lines and the subsequent plurality of collinear lines;
   the intersecting lines from the subsequent plurality of intersecting lines intersecting the subsequent plurality of collinear lines.

5. The computer program product of claim 4 wherein the computer readable code is further capable of causing the computer system to:
   determine whether the plurality of identified features and the subsequent plurality of identified features are substantially overlapping;
   determine whether the plurality of identified features and the subsequent plurality of identified features have substantially similar collinearity; and
   merge the plurality of identified features and the subsequent plurality of identified features if the plurality of identified features and the subsequent plurality of identified features are substantially overlapping and have substantially similar collinearity.

* * * * *